(12) United States Patent
Struckman et al.

(10) Patent No.: US 7,453,400 B2
(45) Date of Patent: Nov. 18, 2008

(54) MULTIPLATFORM TDOA CORRELATION INTERFEROMETER GEOLOCATION

(75) Inventors: Keith A. Struckman, Grand Junction, CO (US); Allan M. Kabel, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 11/701,679

(22) Filed: Feb. 2, 2007

(65) Prior Publication Data

US 2008/0186235 A1    Aug. 7, 2008

(51) Int. Cl.
*G01S 3/02* (2006.01)

(52) U.S. Cl. ...................... 342/465; 342/463
(58) Field of Classification Search ............ 342/357.06, 342/442, 450, 463, 465; 701/213, 215
See application file for complete search history.

(56) References Cited

U.S. PATENT DOCUMENTS

| 5,526,001 | A * | 6/1996 | Rose et al. ............ 342/442 |
| 6,407,703 | B1 | 6/2002 | Minter et al. |
| 2006/0011776 | A1 * | 1/2006 | Maurer et al. ............ 244/1 R |
| 2008/0004798 | A1 * | 1/2008 | Troxler et al. ............ 701/207 |

OTHER PUBLICATIONS

Seymour Stein, "Algorithms for Ambiguity Function Processing", *IEEE Transactions On Acoustics, Speech, and Signal Processing*, vol. ASSP-29, No. 3, pp. 588-599, Jun. 1981.

H.C. Schau and A.Z. Robinson, Passive Source Localization Employing Intersection Spherical Surfaces for Time-of-Arrival Differences, *IEEE Trans. on Acoustics, Speech, and Signal Processing*, vol. ASSP-35, No. 8, pp. 1223-1225, Aug. 1987.
J. S. Abel, "A Divided-and-Conquer Approach to Least-Squares Estimation", *IEEE Trans. on Aerospace and Electronic Systems*, vol. 26, pp. 423-427, Mar. 1990.
B. Friedlander, "A Passive Localization Algorithm and Its Accuracy Analysis," *IEEE Journal of Oceanic Engineering*, vol. OE-12, No. 1, pp. 234-245, Jan. 1987.
Paul C. Chestnut, "Emitter Location Accuracy Using TDOA and Differential Doppler", *IEEE Trans. on Aerospace and Electronic Systems*, vol. AES-18, No. 2, pp. 214-218, Mar. 1982.
U.S. Appl. No. 10/529,829, filed Mar. 30, 2005, Keith A. Struckman.
U.S. Appl. No. 11/249,922, filed Oct. 13, 2005, Keith A. Struckman.

* cited by examiner

*Primary Examiner*—Dao L Phan
(74) *Attorney, Agent, or Firm*—Joseph E. Funk

(57) ABSTRACT

A radio geolocation system is described in which a plurality of moving platforms such as aircraft concurrently receive a signal from a remote transmitter and the geolocation of the transmitter is determined. At each platform every thirty seconds a plurality of samples of the received signal are taken over a one second period. The samples are digitized and a time and GPS location stamp are added to each sample. The digitized samples with time and location stamps from all platforms are transmitted to a central location and stored in covariance matrices, one matrix per one second sample period. The signal samples in each matrix are processed utilizing a unique algorithm to generate a data set which defines a correlation surface. The data from a plurality of data sets are summed together on a point by point basis and normalized to yield a summation data set which defines a summation correlation surface. The summation correlation surface has a well defined peak that defines the geolocation of the remote transmitter.

21 Claims, 12 Drawing Sheets

Receiver - Processor for each of
Collection Aircraft 14 & 15

$S_n(t)$ is the signal received at collection aircraft 15 and 16 and can be represented as
$S_n(t) = A_n \, E[t - \tau_n(t)] + \eta_n(t)$ and $S_1(t)$ & $S_2(t)$ for two aircraft are used below Where:
$A_n$ is a complex scalar that represents the received response including transmitter and receiver antenna directive gains, amplification etc.
$E(t)$ is the signal radiated by the unknown emitter.
$\tau_n(t)$ is the time delay of the signal from the unknown transmitter to aircraft 15 and 16 which is a function of time as the aircraft move.
$\eta_n(t)$ is the noise contributed by the receivers in aircraft 15 and 16.

$$|R_m(x_i, y_j, z_{ij})|^2 = \frac{\left| \int_{T_{ms}}^{T_{mf}} S_1(t + \tau_1(x_i, y_j, z_{ij}, t)) S_1^*(t + \tau_1(x_i, y_j, z_{ij}, t)) dt \right|^2}{\sqrt{\int_{T_{ms}}^{T_{mf}} S_1(t + \tau_1(x_i, y_j, z_{ij}, t)) S_2^*(t + \tau_2(x_i, y_j, z_{ij}, t)) dt} \sqrt{\int_{T_{ms}}^{T_{mf}} S_2(t + \tau_2(x_i, y_j, z_{ij}, t)) S_2^*(t + \tau_2(x_i, y_j, z_{ij}, t)) dt}}$$

Where:
$T_{ms}$ and $T_{mf}$ are the time stamp start and stop times for the $m_{th}$ measurement period.
$\tau_n(x_i, y_j, z_{ij}, t)$ is the theoretical time delay for a radio wave that transverses the distance from the emitter to a collection aircraft 15 or 16 and the assumed testing geolocation $(x_i, y_j, z_{ij})$
$|R_m(x_i, y_j, z_{ij})|^2$ defines the value of pixels in the x,y,z coordinate system that describe the shape of each correlation surface
$S_1$ and $S_2$ are the signals received at collection aircraft 1 and 2 in Figures 5 & 6

MULTIPLATFORM TDOA CORRELATION INTERFEROMETER GEOLOCATION

FIELD OF THE INVENTION

The present invention relates to radio geolocation and, more particularly, to correlating signals received from a remote transmitter using antennas and receivers on different moving platforms to determine the geographical location of the remote transmitter.

BACKGROUND OF THE INVENTION

In the earliest prior art the method of locating the position of a remote transmitter was to utilize a direction finding (DF) triangulation technique where signals from the transmitter are received at widely spaced DF antenna sites. A line-of-bearing (LOB) measurement to the transmitter is measured at each antenna site. When the LOBs are plotted on a map they intersect at the transmitter location. The accuracy of this intersection is directly related to the accuracy of these lines-of-bearing.

In interferometric radio direction finding systems, the phase difference between signals received by two antennas and receivers is measured to determine the angle of arrival of the signal since, for a fixed separation distance between the two sensors, the phase difference is directly related to the angle to be measured. However, interferometric techniques to measure the angle of arrival of an RF signal have posed problems in implementation of the system and accuracy of the measurement.

Interferometers, even those having a long baseline, are subject to a reduced accuracy. The accuracy is greatly reduced by decorrelation of the signals at the two interferometric sensors due principally to the differences of scattering and multi-path propagation effects at the two sensors. In addition, they are frequency sensitive and suffer from phase ambiguity problems.

An alternate approach to determining the angle of arrival of a RF signal is to measure the "time difference of arrival" of the signal between two antennas/receivers that are spaced apart by a distance greater than one wavelength of the RF signal. This is known in the art as TDOA. It may be accomplished for any baseline length so long as the difference in arrival times can be accurately measured since, for a fixed baseline, the delay is directly related to the angle to be measured. Owing to the direction of propagation of the wavefront with relation to the two antennas the wavefront is initially received by a first antenna and subsequently received by the second antenna unless the bearing angle is equal to zero. The TDOA system measures the differential arrival time of the RF signal at the two antennas. For an example see FIG. 1. For each delay in time of arrival of a radio frequency wavefront at the two antennas, there is defined an isodelay hyperbolic line of position upon which the transmitter lies. However, each LOP only locates a transmitter to an arbitrary position on an LOP curve so multiple measurements are taken yielding multiple LOPs. Theoretically, in a perfect system when all hyperbolic lines of position are graphed they will intersect at a single point and the transmitter's location is estimated to be at the point of intersection. However, because of the presence of noise, this is not the case and the multiple isodelay hyperbolic lines of position do not intersect at a single point but, instead, define an "area" in which is located the transmitter. The smaller the "area" the better is the geolocation of the transmitter. TDOA geolocation systems are developed by placing the antennas and receivers on separate platforms. During the measurement periods, the geolocation of these platforms must be accurately known.

Another technique for transmitter position location is known as "frequency difference of arrival" (FDOA), also known in the art as Differential Doppler, and it measures the relative frequency difference (Doppler shift) of a signal arriving at the antennas of different RF antennas/receivers. As an FDOA RF receiver moves directly toward a transmitter the Doppler shift yields the highest positive frequency shift, and as the RF receiver moves directly away from a transmitter the Doppler shift yields the highest negative frequency shift. Movement toward or away from the transmitter at a different angle yields a frequency shift between these two extremes. An FDOA frequency difference measurement defines an isodoppler "line of position" (LOP) upon which the unknown transmitter lies. However, each LOP only locates a transmitter to an arbitrary position on an LOP curve. Due to noise, the FDOA LOPs from multiple antennas/receivers intersect do not intersect at a single point, but typically define an area that provides an estimate of the geolocation of the transmitter. For an example see FIG. 2.

Cross-correlation of a signal received at two antennas/receivers is a well known and commonly used signal processing technique for measuring the relative time delay (TDOA) and frequency shift (FDOA) of a signal. The noise associated with the received signals distorts the cross-correlation result, thereby degrading the accuracy of the TDOA and FDOA measurements. When both techniques are combined the isodelay and isodoppler lines of position (LOPs), jointly define the area in which the transmitter is located. The accuracy of these locations is taught in a paper by Paul C. Chestnut, "Emitter Location Accuracy Using TDOA and Differential Doppler," *IEEE Trans. on Aerospace and Electronic Systems*, Vol. AES-18, No. 2, pp. 214-218 March 1982

Because of noise and interfering signals, the combined TDOA/FDOA signal prevents the multiple isodelay and isodoppler lines of position (LOPs) from intersecting at the same point. Rather, the lines intersect at several points, as shown in FIG. 3, forming an area or region within which the transmitter should be located, rather than defining a precise position location.

At times, the TDOA estimates constituting the system of equations contain redundancies which make the system solutions inconsistent. In this case there is no unique solution, and the fix estimate can only be optimized according to some error criterion, such as the least-squares error. Even then there are still significant errors. Several methods have been proposed for inconsistent systems. One is the Spherical Intersection Method taught in a paper by H. C. Schau and A. Z. Robinson, "Passive Source Localization Employing Intersection Spherical Surfaces for Time-of-Arrival Differences," *IEEE Trans. on Acoustics, Speech, and Signal Processing*, Vol. ASSP-35, No. 8, August 1987, pp. 984-995. A second is the Spherical-Interpolation Method taught in a paper by B. Friedlander, "A Passive Localization Algorithm and Its Accuracy Analysis," *IEEE Journal of Oceanic Engineering*, Vol. OE-12, No. 1, pp. 234-245, January 1987. A third is the Divide and Conquer Method taught in a paper by J. S. Abel, "A Divided-and-Conquer Approach to Least-Squares Estimation," *IEEE Trans. on Aerospace and Electronic Systems*, Vol. 26, No. 2, pp. 423-427, March 1990.

Transmitter position location has also been achieved by "correlation interferometer geo-location" (CIGL) which requires fewer antennas and associated receivers than utilized in the prior art. Very broadly, this is accomplished by moving correlation processing from the direction finding AOA function into the transmitter location function, and it is based on the correlation summation of voltages measured at the antennas of a DF antenna array. One such CIGL system is taught in PCT Patent application No. US 2004/03373, filed Feb. 6, 2004, and entitled "Correlation Interferometer Geo-location". Another such GIGL system is taught in U.S. patent application Ser. No. 11/249,922, filed Oct. 13, 2005, and entitled "Moving Transmitter Correlation Interferometer Geo-location".

One of the features of TDOA/CIGL that makes it stand apart from the prior art is its ability to effortlessly integrate data from multiple platforms, and/or multiple collection episodes. Prior to the appearance of TDOA/CIGL, one could derive a TDOA estimate for each pair of antennas and receivers, and from that, construct a set of hyperbolas representing the mapping of TDOA onto 3-dimensional space. The difficult task then remained of solving a nonlinear system of equations that described the TDOA hyperbolas, in order to arrive at a position estimate. In those cases with an inconsistent system of equations, the task became one of finding the best position estimate in a least square error sense. A TDOA/CIGL algorithm obviates the need for solving these sets of nonlinear equations.

Thus, there is a need in the art for a way to combine the strengths of the TDOA and FDOA methods of transmitter location and the strengths of the CIGL processing technique to achieve more accurate results in geolocating transmitters.

SUMMARY OF THE INVENTION

The need in the art for a way to combine the strengths of the TDOA and FDOA methods of transmitter geolocation and the strengths of the CIGL method of transmitter geolocation are met by the present invention. The present invention minimizes existing problems associated with prior art TDOA/FDOA transmitter geolocation methods to provide more accurate geo-location information of remote transmitters. The novel combination of CIGL with TDOA/FDOA requires fewer antennas and associated receivers than used in the prior art while providing highly accurate geolocation information for remote transmitters.

One of the major problems with existing TDOA\FDOA geolocation algorithms is determining the optimum weighting of the independent TDOA and FDOA contours. Increasing signal bandwidth makes hyperbolic TDOA contours more accurate and higher frequency signals make FDOA contours more accurate. TDOA-CIGL processing automatically optimally weights both TDOA and FDOA signal components and is therefore designed to meet the Cramer-Rao lowest error bound. Conjugate gradient computations within the new geolocation processing algorithm quickly home in on the correlation maximum that more accurately defines a remote transmitter's geolocation.

An advantage to combining CIGL with TDOA processing is that it produces one optimal processing algorithm rather than needing two or more algorithms to obtain a geolocation solution. In addition, when combining CIGL with TDOA processing there is an automatic inclusion of the FDOA effect which further simplifies the processing. The FDOA Doppler effect is simply created by the rate of change of time-of-arrival as the receiver either advances or recedes relative to a remote transmitter.

Another advantage to the novel TDOA/CIGL processing algorithm is that it eliminates any need to calculate the "cross ambiguity function" (CAF) and the problems associated with it. That is, it eliminates both CAF plane analysis and interpolation. As a final result conjugate gradient computations quickly home in on the correlation maximum that defines a transmitter's geolocation. Closed form gradient calculations that initialize with received voltage derivatives, aid in the accuracy and speed of these geolocation computations.

Yet another advantage of using the novel TDOA/CIGL processing algorithm is that it moves the correlation process from the TDOA/FDOA/LOB estimation function to the emitter location function. Multiple sets of DF correlations and CAF surface correlations are mapped to the Earth's surface, thereby reducing extraneous correlation peaks and pinpointing the emitter.

One of the features of the TDOA/CIGL processing that makes it stand apart from the prior art is its ability to effortlessly integrate data from multiple platforms, and/or multiple collection episodes. Prior to the appearance of CIGL, one could derive a TDOA estimate for each pair of antennas and receivers on separate platforms, and from that, construct a set of hyperbolas representing the mapping of TDOA onto 3-dimensional space. The difficult task then remained of solving a nonlinear system of equations that described the TDOA hyperbolas in order to arrive at a position estimate. In those cases with an inconsistent system of equations, the task became one of finding the best position estimate in a least square error sense. CIGL obviates the need for solving all these sets of nonlinear equation Summarizing the advantages of using the novel TDOA/CIGL processing, it: (a) can include TDOA and FDOA and LOB measurements in the geolocation estimation process and can combine it with beamforming, (b) can integrate data from any number of platforms to form a solution, (c) can integrate measurements from successive snapshots from any and all platforms, (d) can work with as few as one antenna on each platform, and (e) can combine the TDOA/FDOA/LOB measurement process with the geolocation process and thereby avoids the pitfalls of methods that separate these two processes, including throwing away useful information.

A system implementing the present invention utilizes two or more aircraft in flight to receive signals from a remote transmitter. The received signals are sampled at a Nyquist rate, digitized and stored at each aircraft. The period of each set of samples is typically one set for each second of flight. The number of sets of samples is operationally based on the range to the transmitter and the length of the transmission and is usually between 10 and 100.

Each digitized signal sample in each set of samples has a time of receipt stamp affixed to it derived from a highly accurate atomic clock. Each digitized signal sample also has a GPS location stamp affixed to it indicating the geolocation of the receiver when the signal sample is taken.

The digitized signal samples with their time stamps and GPS location stamp from all aircraft are transmitted back to a central TDOA/CIGL processor where they are all stored in a covariance matrix. The stored data sets are then processed to compute data defining a series of correlation surfaces, one for each data set. Thus, the signal data collected is used in the algorithm defined in FIG. 7 for the computation of data sets defining individual correlation surfaces such as shown in FIGS. 8-10. The surfaces need not be graphed during operation.

To correct the signal samples stored in the data sets for array distortions, such as aircraft electromagnetic scattering, a correlation table constructed during system calibration is accessed and mapped as the correlation surfaces are computed.

Each independent correlation surface, such as shown in FIGS. 8-10, has a number of peaks, valleys and ridge lines. Under ideal conditions, the highest ridge line of each independent correlation surface follows the TDOA Line of Position (LOP). Upon summation of the individual correlation surfaces (See FIG. 11), the surface representing the summation contains a well defined peak that is higher than the correlation values at all other pixel locations. The location of this peak indicates the geolocation of the transmitter. The height and broadness of the peak are indicators of the accuracy of the geolocation process.

The computed data sets defining the series of correlation surfaces are summed and normalized on a pixel by pixel basis and divided by the number of summed correlation data sets to produce a summation data set that defines a correlation surface such as shown in FIG. 11, which is then used to accurately identify the geolocation of a remote transmitter with respect to the aircraft. Summing and normalizing the sequence of correlation surfaces reduces extraneous correlation peaks and develops a correlation surface maximum at the correct geolocation of the remote transmitter.

To accurately locate the highest peak in the summation correlation surface and thereby identify the geolocation of the transmitter, a conjugate gradient search routine is applied to the data defining the summation correlation surface. This search routine is represented in FIG. 11 as a solid line terminating at the peak 60 of the summation correlation surface. Any other reasonable "hill-climbing" algorithm may be used instead of the conjugate gradient method.

DESCRIPTION OF THE DRAWING

The invention will be better understood upon reading the following detailed description in conjunction with the drawing in which:

FIG. 7 shows the equation defining the unique algorithm for deriving correlation surfaces that are used to geolocate remote transmitters;

DETAILED DESCRIPTION

The novel combination of TDOA and CIGL signal processing described herein solves problems of the prior art and improves on transmitter geolocation from moving aircraft. CIGL is adapted to TDOA/FDOA processing as described immediately herebelow. The theory for the present invention is described after a description of the Figures.

Figure 1:
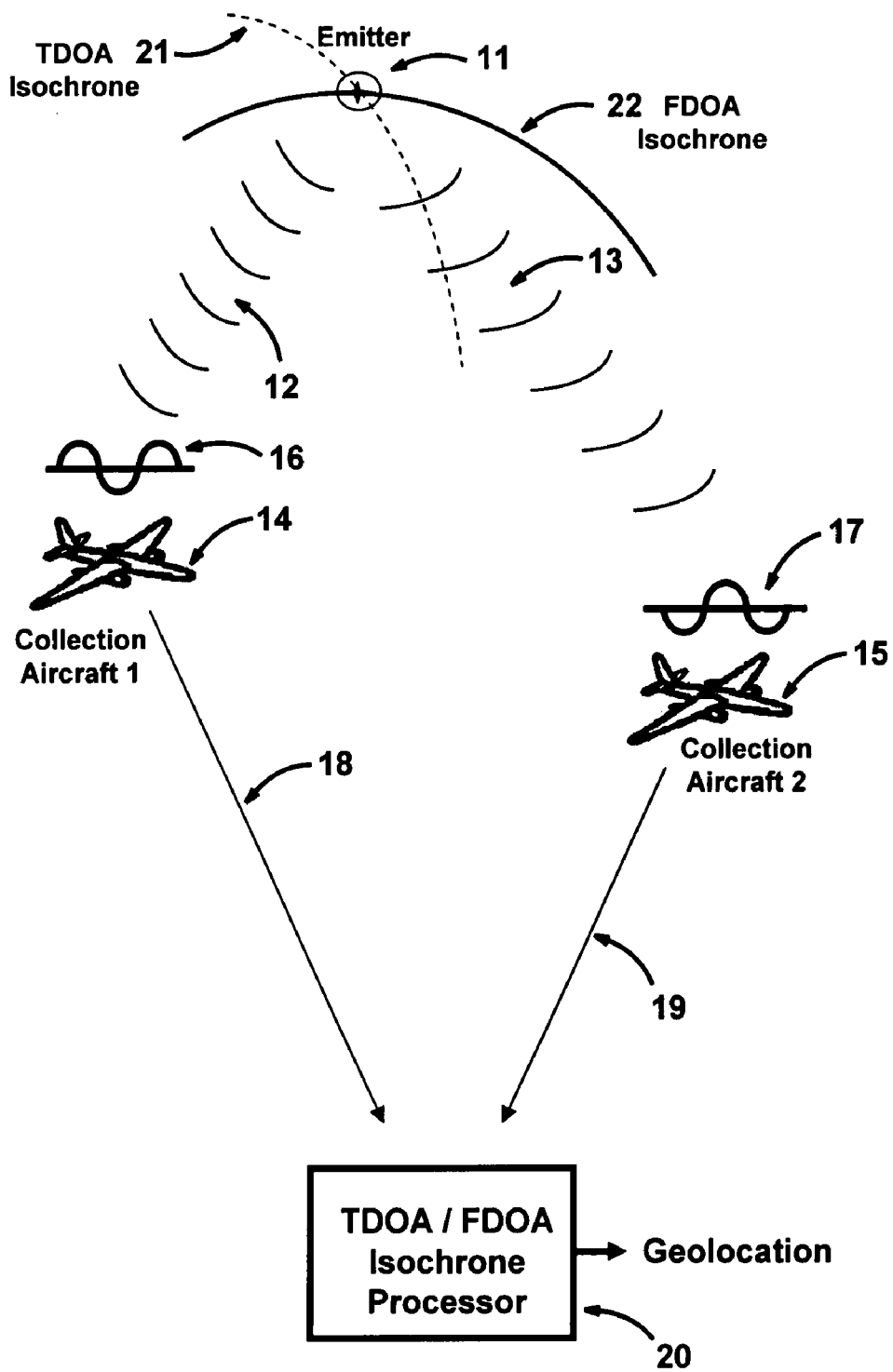
FIG. 1 shows a prior art TDOA/FDOA radio geolocation system that utilizes receivers on separate aircraft to receive signals from a remote transmitter and retransmits the received signals to a central processor for determining TDOA and FDOA isochrones to locate the remote transmitter.

FIG. 1 shows a prior art TDOA/FDOA radio geolocation system that utilizes receivers on separate aircraft 14 and 15 receiving a signal over paths 12 and 13 from a remote emitter/transmitter 11. The radio geolocation system on the aircraft 14 and 15 processes and retransmits the received signals via paths 18 and 19 to a central TDOA/FDOA processor for determining TDOA and FDOA isochrones 21 and 22 to geolocate remote emitter/transmitter 11. Further in this specification, with reference to FIG. 3, is a detailed description of these isochrones and their use in locating transmitter 11, and of TDOA and FDOA.

A TDOA radio geolocation system utilizing aircraft is taught in U.S. Pat. No. 6,407,703, entitled "Multi-Platform Geolocation Method And System" issued Jun. 18, 2002 to Thomas C. Minter et al. In this patent two spatially separated aircraft having accurate position and time measurement capability from the Global Positioning Satellite System collect signals from an emitter. A first location estimate is made as to the location of the transmitter using TDOA, and then at least one more location estimate is made using at least one of a batch least squares analysis and a Kalman filter analysis. The present invention does not use either of these signal processing approaches.

Figure 2:
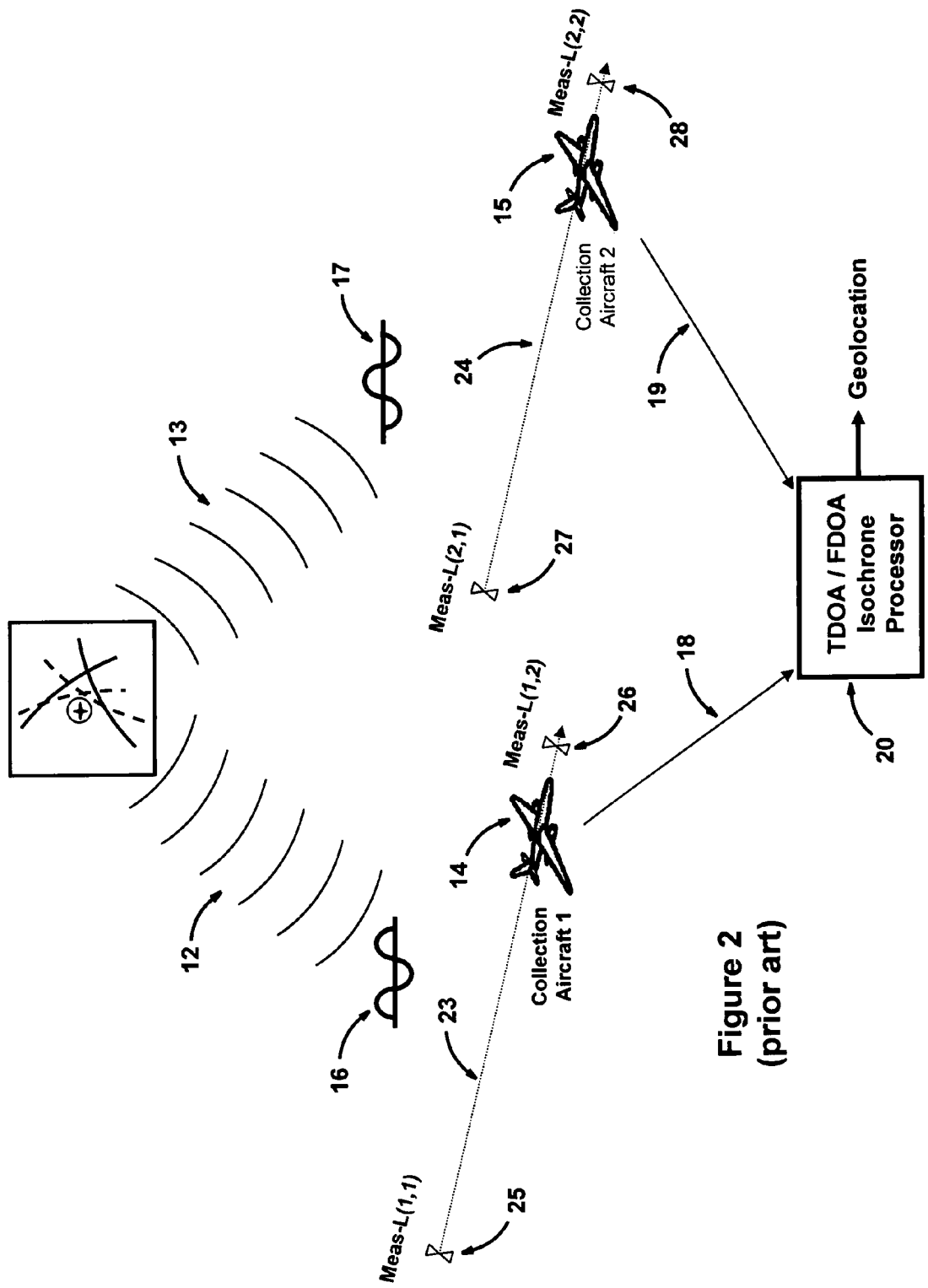
FIG. 2 shows a prior art TDOA/FDOA radio geolocation system where signal samples are taken by receivers on aircraft at a plurality of points during flight and the signals are retransmitted back to a central processor to determine TDOA and FDOA isochrones.

FIG. 2 shows a prior art TDOA/FDOA radio geolocation system where signal samples are taken by receivers on aircraft at a plurality of points during flight and the signals are retransmitted back to a central processor to determine TDOA and FDOA isochrones.

Figure 3:
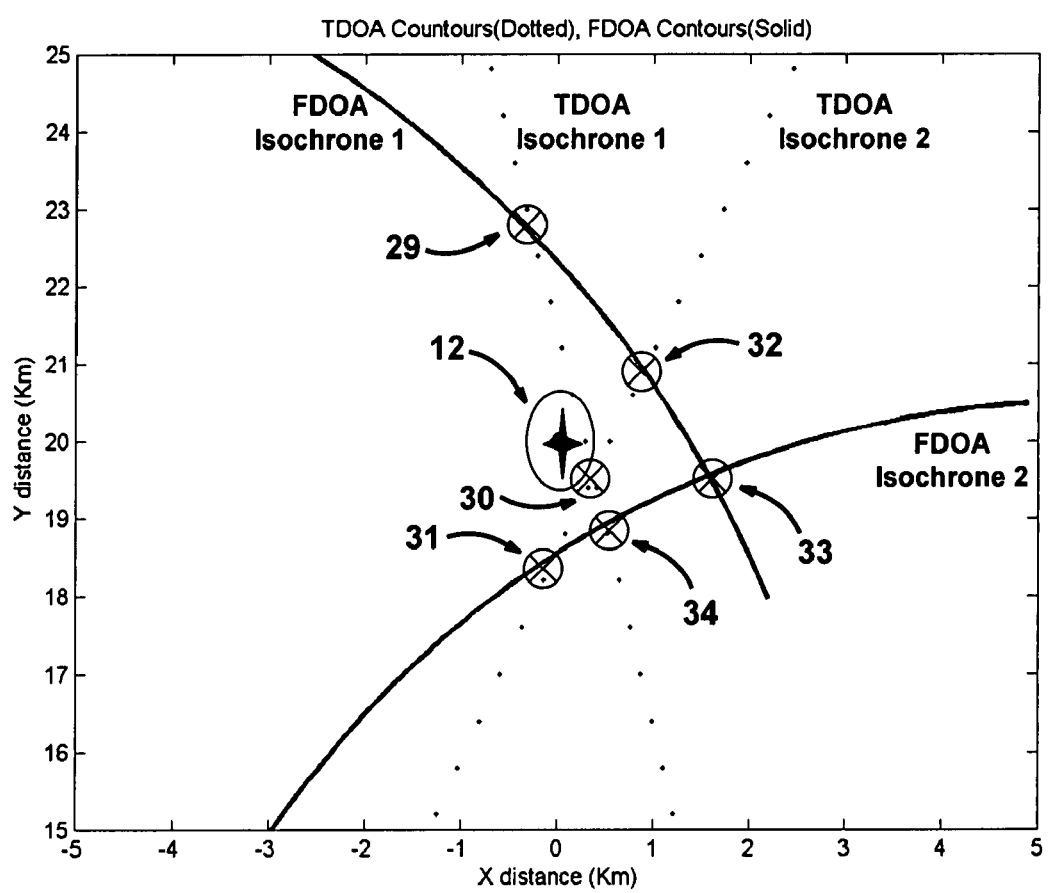
FIG. 3 shows a plot of prior art TDOA and FDOA isochrones and, due to noise, the ambiguity they create as to the actual location of a remote transmitter.

FIG. 3 shows a plot of prior art time division of arrival (TDOA) and frequency division of arrival (FDOA) isochrones and, due to noise, the ambiguity they create as to the actual location of a remote transmitter. In some transmitter location systems both TDOA and FDOA are utilized for increased accuracy. TDOA has been in use for many years in LORAN and GPS.

The length of time a signal from a transmitter travels to each of two or more receivers at known locations is normally unequal and this gives different signal arrival times at each of the receivers. In the TDOA method, the time difference is calculated between the paths from a transmitter to each of two or more receivers such as aircraft 14 and 15 in FIGS. 1 and 2 or to two ground-based receivers. In all cases the geolocation of the receivers are known. In the FDOA method the transmitter or receivers are moving relative to the earth and to one another and the motion introduces a Doppler shift in the signal received at a receiver. FDOA performs signal grooming since the speed and heading of the collection aircraft 14 and 15 are known.

The TDOA measurements result in a locus of points of constant time difference of arrival that define line of position (LOP) hyperbolas of constant time difference as illustrated by the dotted lines marked TDOA isochrone 1 and TDOA isochrone 2 in FIG. 3. The FDOA measurements result in line of position (LOP) hyperbolas of constant time difference as illustrated by the solid lines marked FDOA isochrone 1 and FDOA isochrone 2 in FIG. 3. However, all LOPs only locate an unknown transmitter to an arbitrary position on a curve such as shown in FIG. 3. Multiple LOPs resulting from measurements made at different separated receivers intersect and, theoretically, will all intersect at one point indicating the position of the transmitter. However, due to noise and system inaccuracies the LOPs do not intersect at one point such as see in FIG. 3. In FIG. 3 the LOP intersection points are points 29-34 while the remote transmitter is located at point 12. The location of a remote transmitter will usually be within or just without the area defined by the LOPs as shown in FIG. 3. The area defined by the LOPs is an area an uncertainty which the present invention improves upon.

The present invention combines the time-difference-of-arrival (TDOA) and the frequency-difference-of-arrival (FDOA) resolutions. FDOA is created as the antennas on the aircraft either physically advance or recede from a transmitter during the measurement process. This movement simply increases or decreases the time-of-arrival (TOA) at the points on the wave-front where the voltages are being sampled. Therefore, an accurate description for this geolocation process is TDOA-CIGL not TDOA/FDOA-CIGL since TDOA at the multiple aircraft signal collection platforms generates the FDOA.

Figure 4:
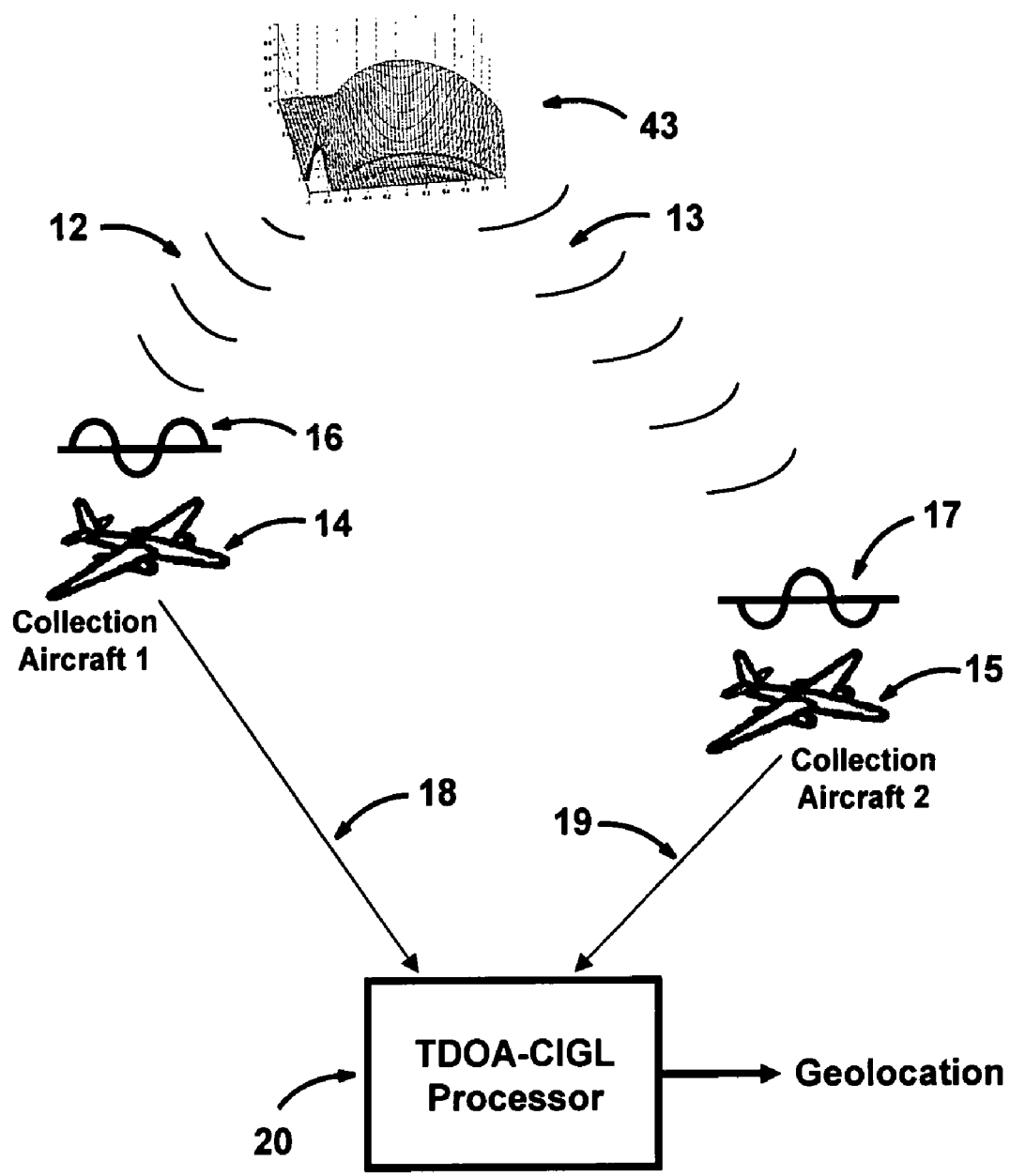
FIG. 4 shows a representation of a TDOA/CIGL radio geolocation system in accordance with the present invention that utilizes receivers on separate aircraft to receive signals from a remote transmitter and retransmit the received signals along with received geolocation and time stamp information to a central processor that uses the signals to derive an individual correlation surface.

FIG. 4 shows a general representation of a TDOA/CIGL radio geolocation system in accordance with the present invention. The overall system utilizes an antenna 35, a receiver 36 and other equipment 38, 39, 40, 41 (shown in FIG. 6) on each of aircraft 14 and 15 to respectively receive signals 12 and 13 from a remote transmitter 11 and retransmit the received signals via a link 18 and 19 to a central TDOA-CIGL processor 20. As previously described with reference to FIG. 4 a received signal is sampled and digitized. Each sample has a geolocation stamp from an inertial navigation system 39 (FIG. 6) such as a GPS system indicating the position of the aircraft when each signal sample is taken. Each sample also has a time stamp from a clock 41 (FIG. 4) indicating the time to within a nanosecond that each signal sample is taken. Each of aircraft 14 and 15 retransmit the stamped signal samples via an onboard transmitter 40 (FIG. 4) to central TDOA-CIGL processor 20 which processes the signals received from aircraft 14 and 15 to geolocate the remote transmitter 11. The retransmission path to processor 20 is represented by arrows 18 and 19.

Figure 5:
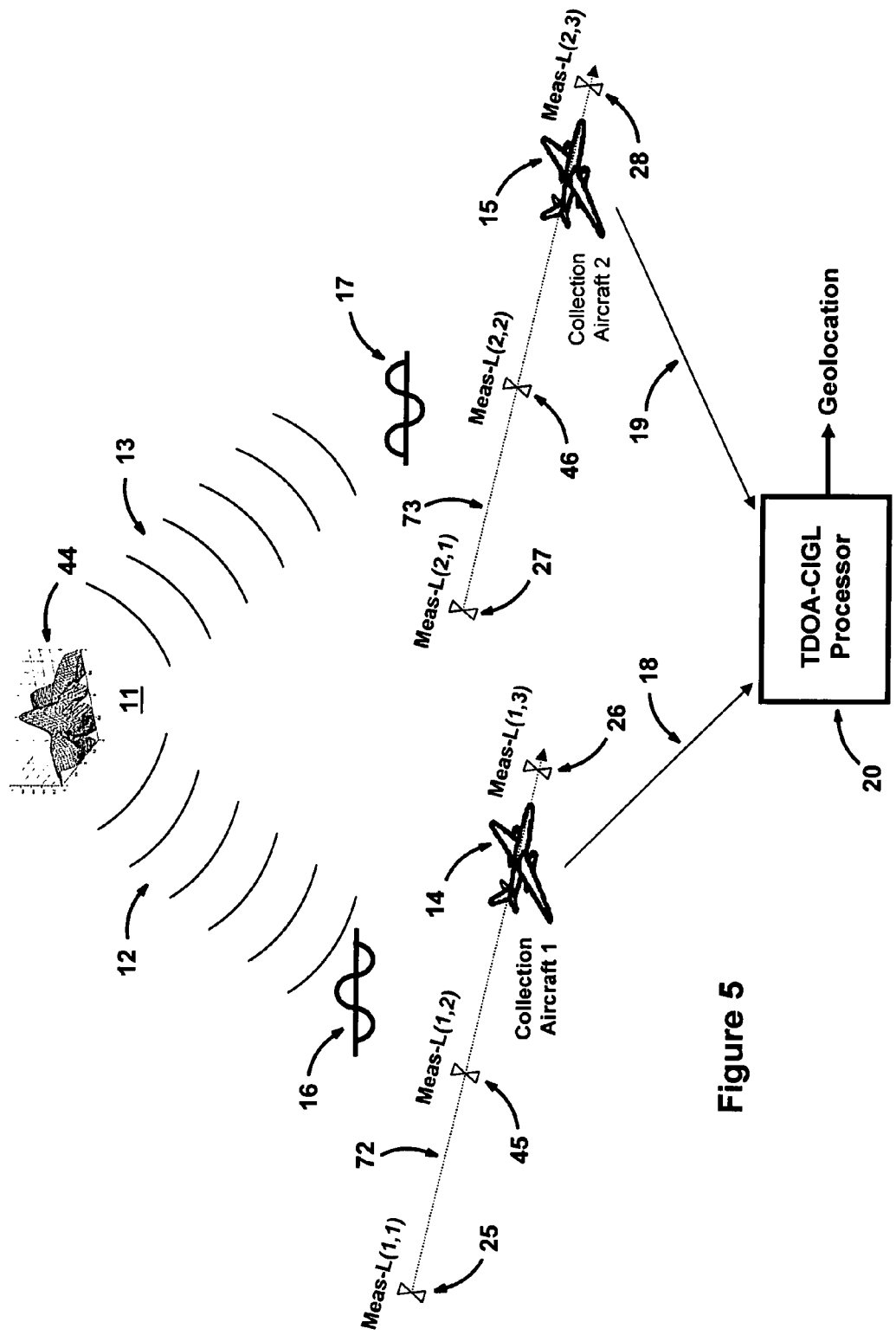
FIG. 5 shows a representation of a TDOA/CIGL radio geolocation system in accordance with the present invention that utilizes receivers on separate aircraft to receive signals from a remote transmitter and retransmit the received signals along with received geolocation and time stamp information to a central processor that uses received signal samples to derive a series of individual correlation surfaces that are then collectively summed and mapped to the Earth's surface to geolocate the remote transmitter.

FIG. 5 shows a more detailed representation of a TDOA/CIGL radio geolocation system in accordance with the present invention. The overall system utilizes an antenna 35, a receiver 36 and other equipment 38, 39, 40, 41 (shown in FIG. 6) on each of aircraft 14 and 15 to respectively receive signals 12 and 13 from a remote transmitter 11 and retransmit the received signals via a link 18 and 19 to a central TDOA-CIGL processor 20. As previously described with reference to FIG. 4 a received signal is sampled and digitized. Each sample has a geolocation stamp from an inertial navigation system 39 (FIG. 6) such as a GPS system indicating the position of the aircraft when each signal sample is taken. Each sample also has a time stamp from a clock 41 (FIG. 4) indicating the time to within a nanosecond that each signal sample is taken. Each of aircraft 14 and 15 retransmit the stamped signal samples via an onboard transmitter 40 (FIG. 4) to central TDOA-CIGL processor 20 which processes the signals received from aircraft 14 and 15 to geolocate the remote transmitter 11. The retransmission path to processor 20 is represented by arrows 18 and 19.

Inertial navigation system 39 on each aircraft 14 and 15 continuously tracks the position and attitude of the aircraft and from this information, the position, velocity and travel vector of the aircraft and antenna is tracked.

Along each flight vector 72 for aircraft 14 and flight vector 73 for aircraft 15 are shown three hour glass shaped marks. Along vector 72 the marks 25, 45 and 26 are designated Meas-L (1,1), Meas-L (1,2) and Meas-L (1,3) and indicate three points during flight of aircraft 14 that a one second signal sampling period occurs. Along vector 73 the three marks 27, 46 and 28 are designated Meas-L (2,1), Meas-L (2,2) and Meas-L (2,3) and indicate three points during flight of aircraft 15 that a one second signal sampling period occurs. These one-second signal sampling periods occur every thirty seconds and thus explain the space between the hour glass shaped marks. The sampling period and measurement repetition rate may be different for different circumstances.

While in flight each of aircraft 14 and 15 is sampling the signal 12 and 13 received from transmitter 11 using the equipment shown in and described with reference to FIG. 6. The sequential sampling periods are for one second every thirty seconds. During each one second sampling period the signal is sampled at a 150 kilohertz rate yielding 150,000 signal samples for each one second sampling period. As mentioned above and described in greater detail elsewhere each signal sample is digitized and has time and location stamps added thereto. Immediately thereafter the digitized and stamped signal samples are retransmitted from aircraft 14 and 15 to central TDOA-CIGL processor 20 which may be a very long distance from the aircraft.

The two aircraft 14 and 15 are usually located at different distances from remote transmitter 11 so the signal arrives at the aircraft at different times. The signal traveling to aircraft 14 is represented by wave front 12 and the signal traveling to aircraft 15 is represented by wave front 13. Because wave front 13 must travel a longer distance to reach aircraft 15 than wave front 12 must travel to reach aircraft 14 there is a phase difference between the signals as they are received as represented figuratively by signals 16 and 17. This phase shift also reflects the Doppler affect caused by the moving aircraft. Signals 16 and 17 are shown one hundred eighty degrees out of phase with each other but this is only representative. The actual phase shift will be different and may vary.

Figure 6:
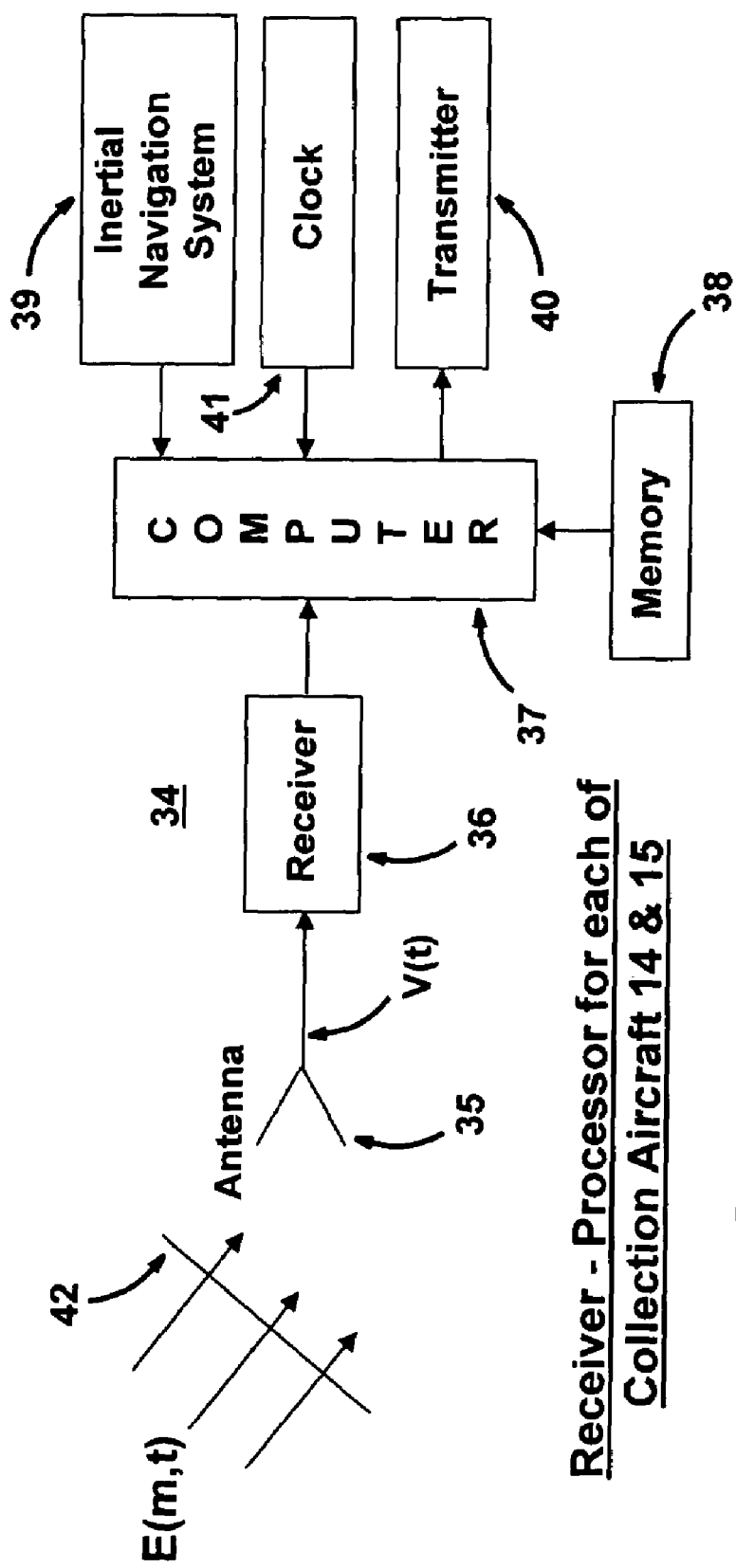
FIG. 6 shows the simplified receiver and processor system on multiple aircraft and implements the present invention for receiving and initially processing signals received from a remote transmitter before they are retransmitted back to a central processor for transmitter geolocation.

In FIG. 6 is shown a block diagram of a receiver and processor system 34 used on each of two or more aircraft to implement the present invention. Unlike the prior art, which requires multiple antennae and multiple receivers on each aircraft, only a single antenna is required with the present invention. A signal 42 E(m,t) from a remote transmitter 11 (shown in FIGS. 4 and 5) are received on a single antenna 35 on each of aircraft 14 and 15 (also shown in FIGS. 4 and 5). The received signal 42 is digitized in receiver 36, is sampled in computer 37 and the signal samples are stored in memory 38. While only two aircraft 14 and 15 are described in this detailed description, and there must be at least two aircraft, more than two aircraft may be utilized.

Continuing the specific example of operation, every thirty seconds the signal 42 received from the remote transmitter 11 is sampled for one second at a 150 Kilohertz rate which produces 150,000 signal samples every sampling period. Computer 37 also receives inputs from an inertial navigation system 39 and a highly accurate clock 41. Navigation system 39 is well known in the art and is used to indicate the position of the aircraft when the signal samples are taken. An atomic clock standard, such as maintained by the National Bureau of Standards, is well known in the art as well as other techniques for synchronizing other clocks to the atomic clock standard. Clock 41 in system 34 on each aircraft 14 and 15 are both synchronized to an atomic clock and are both synchronized to each other within a nanosecond.

At the beginning of each of the large plurality of individual signal samples computer 37 affixes a time stamp indicating the time from clock 41 of receipt of the signal sample Using an input from inertial navigation system 39 computer also affixes a location stamp to each signal sample indicating the geolocation of the airplane 14 or 15 when each signal sample is taken.

Figure 8:
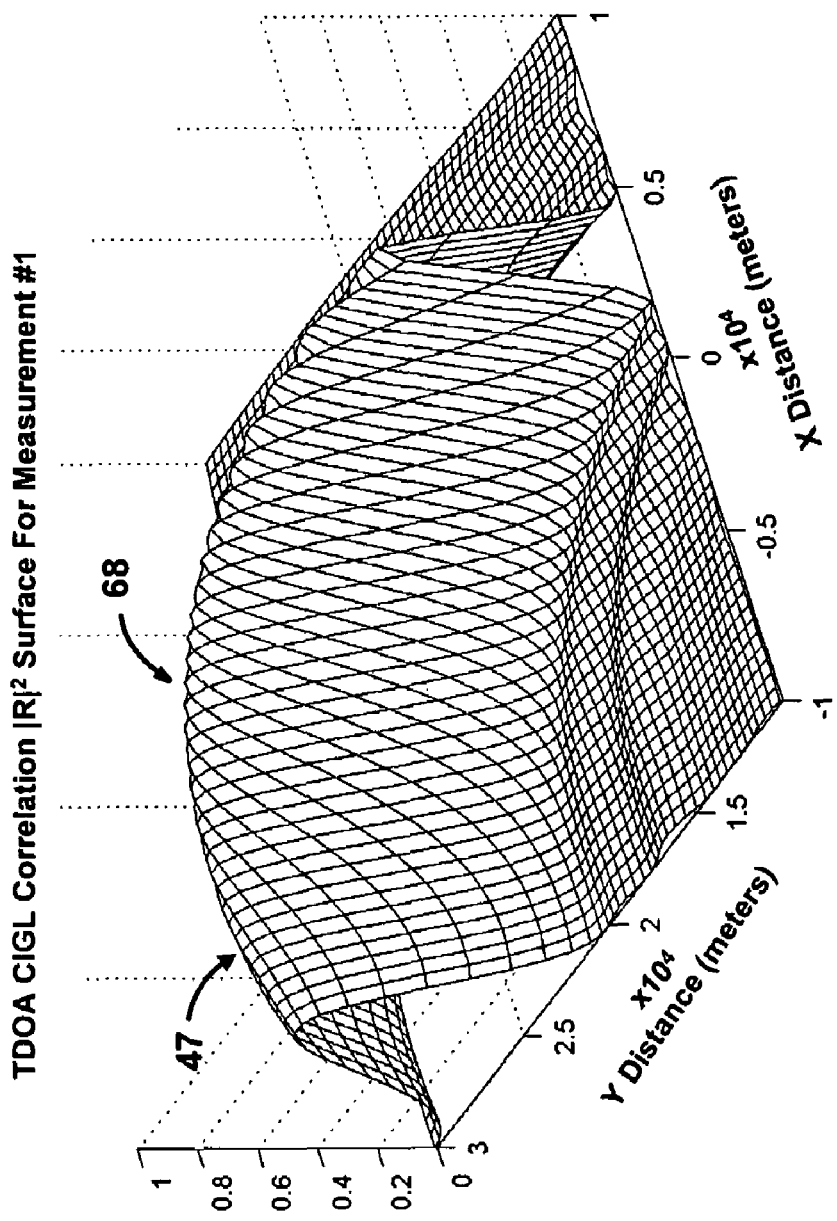
FIG. 8 shows a first of a series of correlation surfaces derived from a first set of data from a received signal using the CIGL process.
Figure 9:
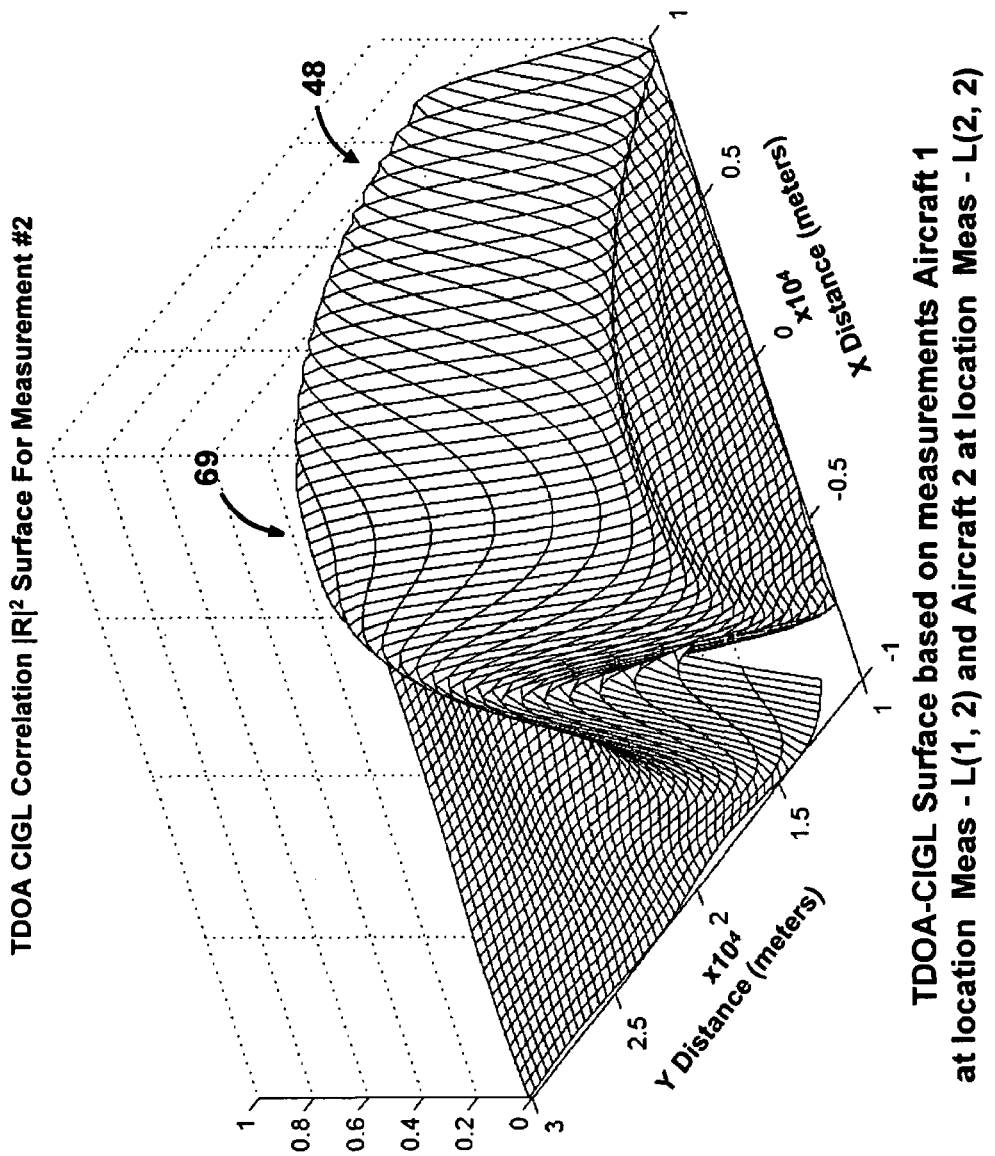
FIG. 9 shows a second of a series of correlation surfaces derived from an second set of data from a received signal using the CIGL process.
Figure 10:
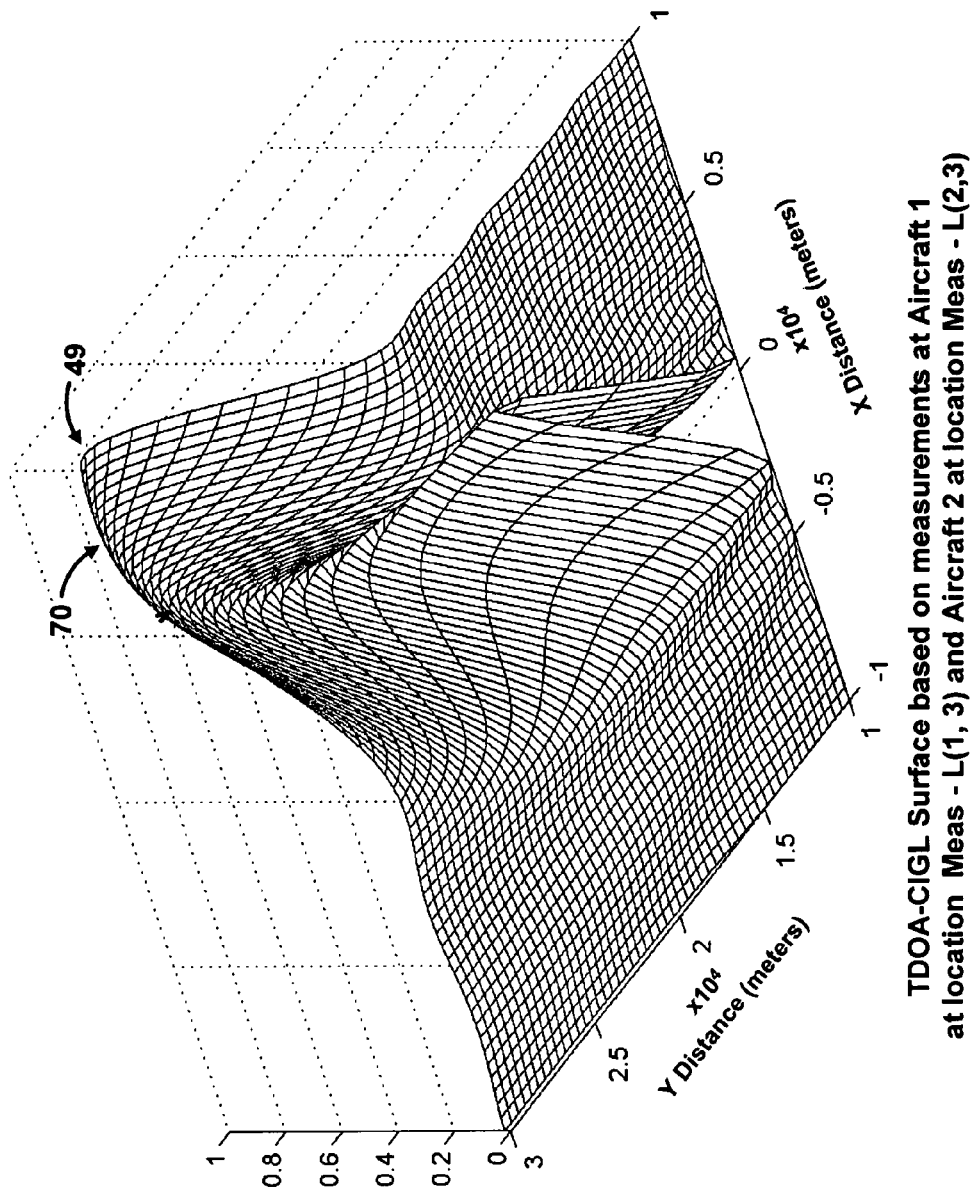
FIG. 10 shows a third of a series of correlation surfaces derived from a latter set of data from a received signal using the CIGL process.
Figure 11:
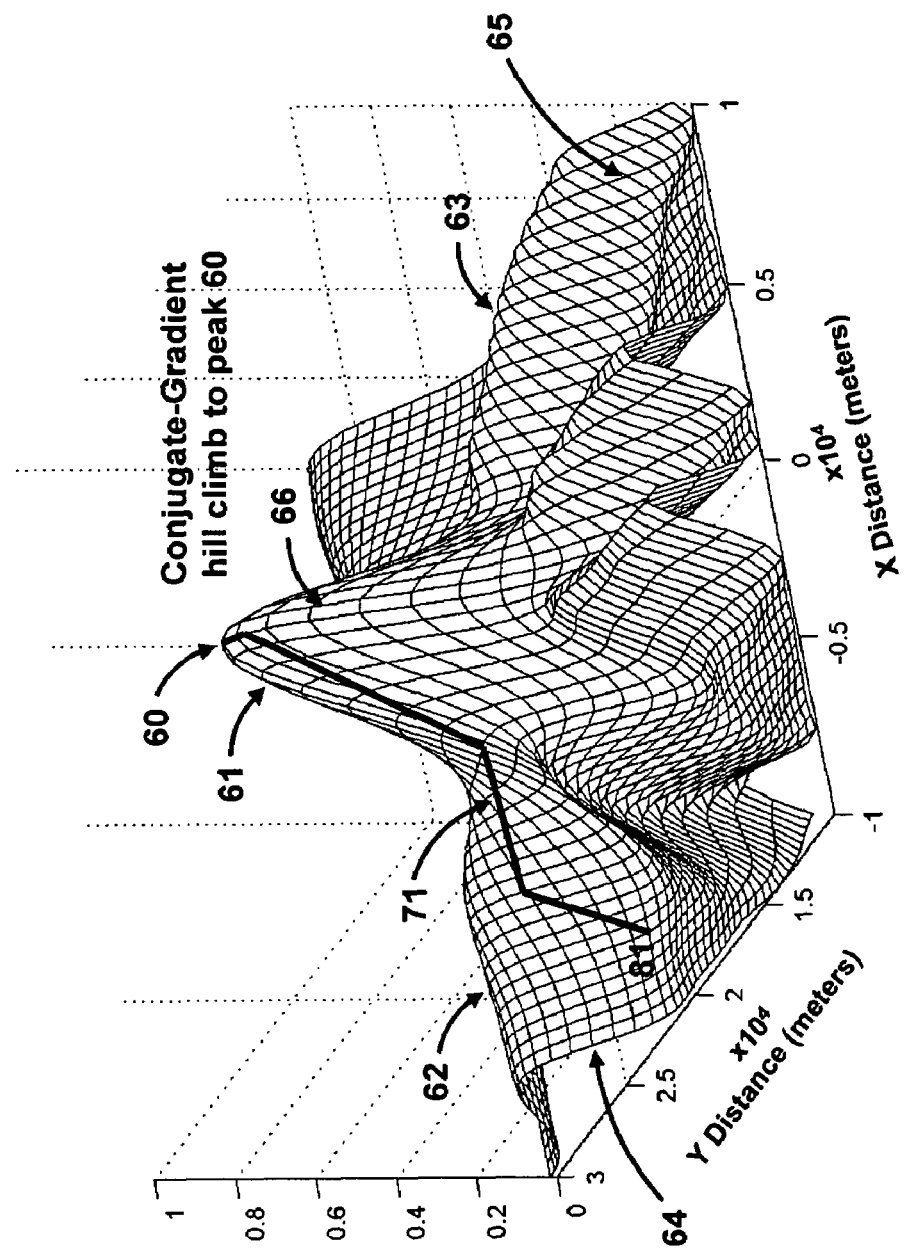
FIG. 11 shows a summation correlation surface derived by summing all the individual correlation surfaces and the summation correlation surface has a peak that is mapped to the terrain of the earth to geolocate the remote transmitter.

After the collection of each set of 150,000 signal samples with the time and location stamps attached, the data are retransmitted using onboard transmitter 40 via path 18 and 19 in FIG. 5 back to a centrally located TDOA-CIGL processor 20. Processor 20 receives and stores these signal sample sets from each of collection aircraft 14 and 15 in covariance matrices and then processes them to generate a data set that defines a correlation surface such as shown in FIGS. 8, 9 and 10. After some number of correlation surfaces are defined processor 20 sums the data sets to produce a summation correlation surface such as shown in FIG. 11. This process is described in greater detail further in this detailed description with reference to FIG. 7.

FIG. 7 shows two equations. The equation $S_n(t)$ mathematically defines the signal received at each of collection aircraft 15 and 16. In this equation $A_n$ is a complex scalar that represents the received response including transmitter and receiver antenna directive gains, amplification etc. E(t) is the signal radiated by the unknown emitter. $\tau_n(t)$ is the time delay of the signal from the unknown transmitter to collection aircraft 15 and 16 which is a function of time as the aircraft move. $\eta_n(t)$ is the noise contributed by the receivers in collection aircraft 15 and 16.

The other equation defining $R_m$ is the unique algorithm used for deriving correlation surfaces, such as shown in FIGS. 8, 9 and 10, to implement the teaching of the present invention. $R_m$ in terms of x, y, z yields the information defining the value of pixels in the x,y,z coordinate system that describe the three dimensional shape of each correlation surface, such as shown in FIGS. 8, 9 and 10. For each one second sampling period there is data generated for one correlation surface, and all that data is used in the $R_m$ equation. While the equation is shown and initially solved as $|R_m|^2$, the value of $R_m$ is simply derived there from by taking the square root.

The terms on the right side of the equation are as follows: $T_{mf}$ and $T_{ms}$ are portions of the time stamp added to each digitized signal sample generated at each of collection aircraft 14 and 15 and transmitted to central TDOA-CIGL processor 20 (FIGS. 5&8) as previously described with reference to FIG. 4. As previously described, there are several sampling periods, each of which may be one second long, for example. The subscript letter "m" indicates which one second sampling period is represented. Applying our running example, every thirty seconds the signal received from the remote transmitter 11 is sampled for one second at a 150 Kilohertz rate which produces a plurality of finite signal samples. The subscript letter "f" indicates the time at the beginning of each one second sampling period, and the subscript letter "s" indicates the time at the end of each one second sampling period. Thus, $T_{27f}$ is the time, as derived from the atomic clock 41 in FIG. 4, at the start of a $27^{th}$ one second sampling period, and $T_{27s}$ is the time, as derived from the atomic clock 41, at the end of the same one second sampling period.

$S_1(t)$ and $S_2(t)$ are the value of the signal samples, as described several paragraphs above. Signal $S_1(t)$ is from collection aircraft 14 and signal $S_2(t)$ is from collection aircraft 15. If there are more collection aircraft the equation would have to be expanded to add more terms such as $S_3(t)$, $S_4(t)$. $\tau_n(x_\iota, y_j, t)$ is the theoretical time delay for a radio wave that traverses the distance from the emitter to a collection aircraft 15 or 16 from an assumed testing geolocation $(x_\iota, y_j)$. This is a theoretical time delay for signals received from an assumed geolocation of the remote transmitter 11 because the actual position of the transmitter is not known. During signal processing at TDOA-CIGL processor 20, assumptions are made as to the geolocation of remote transmitter 11 and a solution is determined. These assumptions change the term $\tau_n(x_\iota, y_j, t)$ in the equation. When a correct assumption is finally made as to the geolocation of a remote transmitter 11 during processing of the 150,000 received signal samples for a one second sampling period, there will be a peak in the calculated data that has a value of unity, assuming no noise in the received signal. Due to noise the actual value will be less than one, but it will be a global maximum value as compared to values obtained for other assumptions. For incorrect geolocation assumptions the processing data may form a peak but its value will be less than one, and will also be less than the value obtained for the correct assumption. Since the speed and direction of collection aircraft 14 and 15 are known any Doppler effects are automatically taken into account.

After processing is done using the 150,000 signal samples taken during each one second sampling period, there is defined a correlation surface for each one-second sampling period, such as shown in FIGS. 8, 9 and 10. There is no need during actual operation to graph the data, and it is done here only to better understand the invention. As described above the calculated data for each correlation surface comprises an amplitude value at each pixel defined in the x,y,z coordinate system.

Each individual correlation surface has a number of peaks, valleys and ridge-lines as shown in FIGS. 8, 9 and 10. Under ideal conditions, the highest ridge-line of each individual correlation surface follows the TDOA Line-of-Position (LOP). The data of a plurality of individual correlation surfaces, determined as previously described, are used to produce a summation correlation surface, such as shown in FIG. 11. The summation correlation surface in FIG. 11 contains a well defined peak 60 that is higher than the other peaks (e.g. 63) of the summation correlation surface. The location of this peak 60 indicates the geolocation of the remote transmitter.

The summation correlation surface is then analyzed as described below with reference to FIG. 11 to determine the geolocation of remote transmitter 11 on the terrain of the earth. This includes the altitude of remote transmitter 11.

First, the amplitude or amplitude or z value at each of the like x,y pixels of a plurality of correlation surfaces are added together and then divided by the number of signal samples that have been added together. This is done for each pixel point in the data sets defining the plurality of correlation surface. When this is done one summation data set is derived. If this summation data set were graphed the result would be the summation correlation surface shown in FIG. 11. A conjugate gradient search, or other "hill-climbing" algorithm, is then applied to the summation data set to find the peak 60 which geolocates the remote transmitter 11 in x,y,z terms mapped to the terrain of the earth, which includes altitude. The conjugate gradient search is described in detail further in this Detailed Description.

In FIG. 8 is shown a first of a series of correlation surfaces each derived from a first set of data captured during a one second period by using the CIGL process. As previously described with reference to FIGS. 4 through 6, signals from a remote transmitter 11 are received by an antenna 35, receiver 36 and processing equipment 37 & 38, such as shown in FIG. 4, on at least two aircraft 14 & 15 as shown in FIGS. 5 & 7. The received signals are digitized, and have a time stamp derived from a highly accurate atomic clock 41 and a geolocation stamp derived from an accurate global positioning system 39 attached thereto. The composite signals from each aircraft 14 & 15 are transmitted back to a central TDOA-CIGL processor 20, such as shown in FIGS. 5 & 6, which stores and processes the signals through a unique algorithm shown in FIG. 7 to derive data which, if graphed, show the correlation surface in FIG. 8. There is no need during actual operation to graph the data, and it is done here only to better understand the invention. The correlation surface shown in FIG. 8 has a number of peaks, valleys and ridge-lines. Under ideal conditions, the highest ridge-line 47 of the correlation surface follows the TDOA Line-of-Position (LOP) isocrone. One ridge-line 47 of the summation correlation surface often contains a well defined peak 68 that is higher than the correlation values at all other geometric grid locations on the correlation surface. The location of a well defined peak 68, when it exists, indicates the geolocation of the transmitter.

In FIG. 9 is shown a second of a series of correlation surfaces derived from an intermediate set of data from a received signal using the CIGL process. As previously described with reference to FIGS. 4 through 7, signals from a remote transmitter are received by an antenna 35, receiver 36 and processing equipment 37 & 38, such as shown in FIG. 4, on at least two aircraft 14 & 15 as shown in FIGS. 5 & 7. The received signals are digitized, and have a time stamp derived from a highly accurate atomic clock 41 and a geolocation stamp derived from an accurate global positioning system 39 attached thereto. The composite signals from each aircraft 14 & 15 are transmitted back to a central TDOA-CIGL processor 20, such as shown in FIGS. 5 & 7, which stores and processes the signals through a unique algorithm shown in FIG. 6 to derive data which, if graphed, show the correlation surface in FIG. 9. There is no need during actual operation to graph the data, and it is done here only to better understand the invention. The correlation surface shown in FIG. 9 has a number of peaks, valleys and ridge-lines. Under ideal conditions, the highest ridge-line 48 of the correlation surface follows the TDOA Line-of-Position (LOP) isocrone. One ridge-line 48 of the summation correlation surface often contains a well defined peak 69 that is higher than the correlation values at all other geometric grid locations on the correlation surface. The location of a well defined peak 69, when it exists, indicates the geolocation of the transmitter.

In FIG. 10 is shown a third of a series of correlation surfaces derived from a final set of data from a received signal using the CIGL process. As previously described with reference to FIGS. 4 through 7, signals from a remote transmitter are received by an antenna 35, receiver 36 and processing equipment 37 & 38, such as shown in FIG. 4, on at least two aircraft 14 & 15 as shown in FIGS. 5 & 7. The received signals are digitized, and have a time stamp derived from a highly accurate atomic clock 41 and a geolocation stamp derived from an accurate global positioning system 39 attached thereto. The composite signals from each aircraft 14 & 15 are transmitted back to a central TDOA-CIGL processor 20, such as shown in FIGS. 5 & 7, which stores and processes the signals through a unique algorithm shown in FIG. 6 to derive data which, if graphed, show the correlation surface in FIG. 10. There is no need during actual operation to graph the data, and it is done here only to better understand the invention. The correlation surface shown in FIG. 10 has a number of peaks, valleys and ridge-lines. Under ideal conditions, the highest ridge-line 49 of the correlation follows the TDOA Line-of-Position (LOP) isocrone. One ridge-line 49 of the summation correlation surface often contains a well defined peak 70 that is higher than the correlation values at all other geometric grid locations on the correlation surface. The location of a well defined peak 70, when it exists, indicates the geolocation of the transmitter.

The summation of the correlation surfaces shown in FIGS. 8, 9 and 10 result in a summation correlation surface shown in FIG. 11. This correlation surface determines more exactly the geolocation of the remote transmitter that resides on the surface of the earth.

At central TDOA-CIGL processor 20 the data sets received from collection aircraft 1 and 2 for each one second sampling period done every thirty seconds are first used to generate the data defining each of the individual correlation surfaces. There is one individual correlation surface for each one second sampling period. When the data for a series of individual correlation surfaces are added together on a point by point basis and the sum at each point is divided by the number of samples that are added together. The result is a summation data set which, if graphed, yields the summation correlation surface shown in FIG. 11. There is no need during actual operation to graph the data, and it is done here only to better understand the invention. The correlation surface shown in FIG. 11 has a number of peaks, valleys and ridge-lines such as 61, 62 and 63. Under ideal conditions, the individual ridge lines, such as 62 and 63, of the summation correlation surface follow the individual Lines-of-Position. Due to the effects of the summation of the individual correlation surfaces, one ridge-line 61 of the summation correlation surface contains a well defined peak 60 that is much higher than the correlation values at all other geometric grid locations on the summation correlation surface. This is seen in FIG. 11. The location of this peak 60 indicates the geolocation of the remote transmitter 11.

A conjugate gradient search, or other "hill-climbing" algorithm search, is then performed on the data defining the surface of the summation correlation surface shown in FIG. 11 in order to locate the highest point 60 on the highest ridge line 61 of the correlation surface. That highest point 60 identifies the geolocation of the remote transmitter 11. Conjugate gradient searching is known in the prior art. It has been demonstrated that for certain types of functions, quadratic functions for example, the use of conjugate gradient direction processing allows convergence to a solution more quickly than the gradient direction. The standard conjugate gradient direction, when calculated at a given point, takes into account the direction of the previous step as well as the newly calculated gradient direction at the given point. If the direction of the step previously taken is designated by a vector B and the newly calculated gradient direction at the given point designated as D, then the conjugate gradient direction at the given point is defined by the vector:

$$C_{conj}=D+hB \tag{EQ 1}$$

where h is a constant which determines the "weight" afforded the previously selected direction. Although the error function to be dealt with herein is not a quadratic function, the technique of tempering the gradient direction based on its past performance has been found useful and is implemented in the present embodiment. For certain types of error functions, it has been found that the use of the conjugate gradient direction avoids the tortuous path of almost perpendicular steps which can arise when using a simple gradient technique.

More particularly the conjugate gradient multi-dimensional search is for the minimum of the function $F(1-R^2)=1-CIGL(|R|^2)$. The term $(1-R^2)$ causes the result of the conjugate gradient searching to be a minimum rather than a maximum. A starting point in the neighborhood of the minimum is selected and the gradient of $F(1-R^2)$ as a function of x and y for this point is computed. Next a line search for the minimum in this first gradient direction is solved for. At this line search minimum, a new gradient is computed which is then inserted into a conjugate gradient routine that computes the next direction for the line search which is then searched for a minimum, and so on. These search steps quickly converge to a minimum which is identified by slope gradient computations that are approximately equal to zero. The multipoint search path to the minimum point of $F(1-R^2)$ is a path to the maximum of $CIGL(|R|^2)$ which is mapped as lines to point 60 in FIG. 11. The correlation function $CIGL(|R|^2)$ is always less than unity, therefore $F(1-R^2)$ is always greater than zero.

To find the highest point 60 at the highest peak of the highest ridge line in FIG. 11 and thereby identify the geographical location of the remote transmitter 11, the previously described conjugate gradient searching may need to be performed starting at many points on the summation correlation surface shown in FIG. 11. The reason for this is as follows. In FIG. 11 it should be noted that there is the highest ridge peak line 61 and multiple lower ridge peak lines such as 62 and 63. If a starting point for a conjugate gradient searching sequence is chosen on sloped side 64, as shown, the conjugate gradient searching will erroneously find a peak point on lower ridge line 62 and not on ridge line 61. Similarly, if a starting point 65 for another sequence of conjugate gradient searching is chosen on the sloped side of ridge 63, the conjugate gradient searching will erroneously find a peak point on lower ridge line 63 and not on ridge line 61. Thus, by choosing a number of conjugate gradient search starting points around the data that defines the summation correlation surface in FIG. 11, some of them will fall on the slopes 66 that define the highest ridge line 61 and the peak point 60. The minimization results of the plurality of conjugate gradient searches are then compared to each other to find the value that corresponds to point 60 and identifies the geolocation of the remote transmitter. One such sequence of linking search lines for one such conjugate gradient search is shown as the crooked line 71 in FIG. 11, and it is the result of the choosing the best search starting point 81 which yields the best conjugate gradient search locating peak 60.

Figure 12:
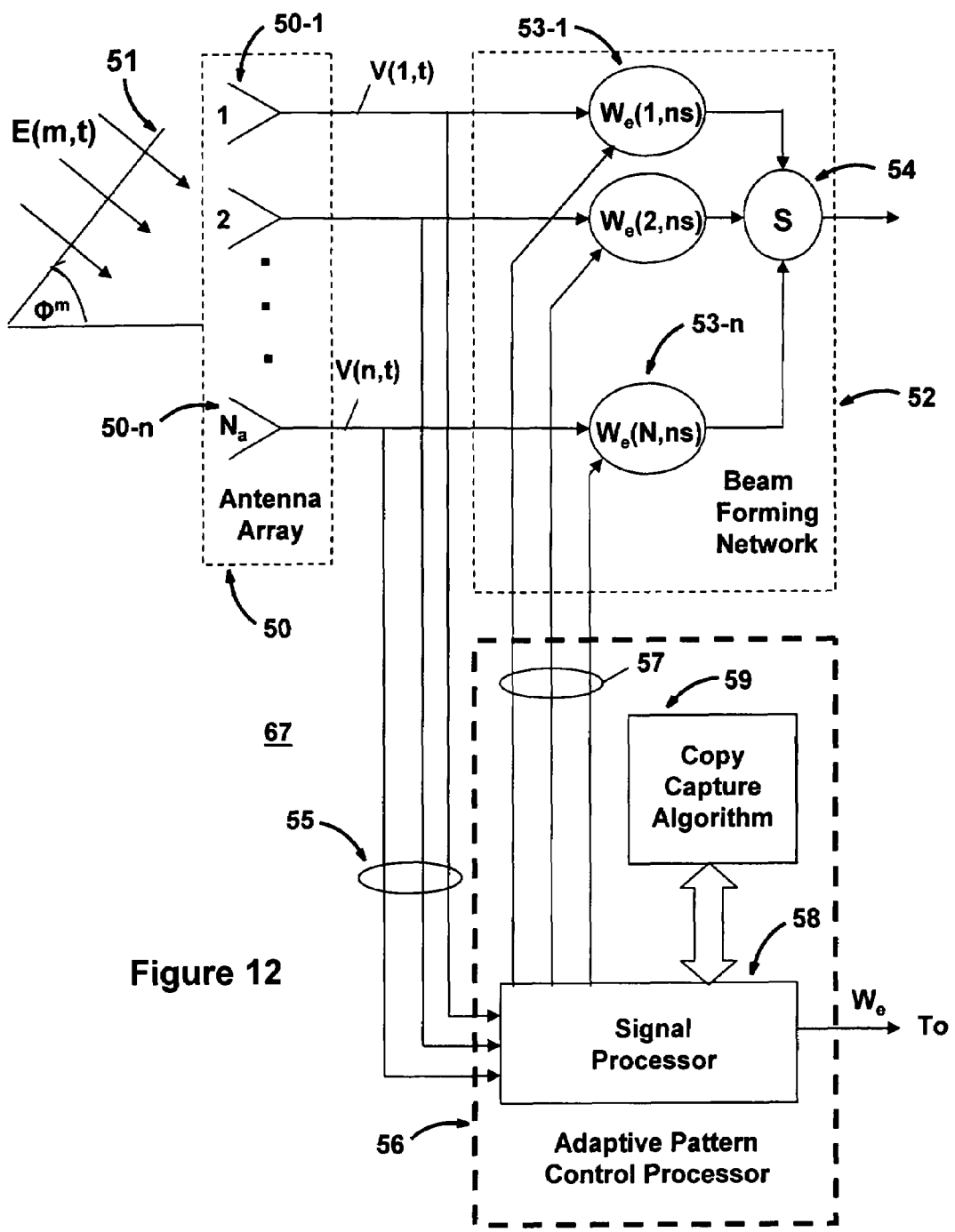
FIG. 12 shows a subsystem that may be used to combine a copy capture arrangement with two or more antennas on each aircraft to improve geolocation accuracy in extreme environments wherein there are unknown and undesired interfering signals, and thermal background noise.

In FIG. 12 is shown a functional block diagram of a multiple element array which may reside on a platform. Whenever a platform has multiple sensors, the geolocation methodology can take advantage of data that is traditionally associated with angle-of-arrival estimation and/or beam forming techniques.

The simplest way to handle the data from platforms having multiple sensors is as follows: One may determine the correlation functions among the on board sensors independently of the CAF surfaces, and add them to the overall summed correlation. Let $r_{im}(x,y,z)$ be the normalized TDOA-CIGL correlation function, presented in FIG. 7, developed from the array on platform i, at snapshot m, at test point (x,y,z). Also, let $r'_{im}(x,y,z)$ be the normalized basic CIGL correlation function (described in PCT patent application US/2004/003373, filed Feb. 6, 2004, entitled Correlation Inteferometer Geolocation) which is developed from the array on platform i at snapshot m for test point (x,y,z). Then the two correlation forms may be included in a summation shown in the following equation:

$$R^2(x,y,z) = \sum_{i,j,m} |r_{i,j,m(x,y,z)}|^2 + \sum_{i,m} |r'_{i,m(x,y,z)}|^2 \tag{EQ 2}$$

As before the best point estimate is the location (x,y,z) which maximizes the correlation summation.

An alternate way to handle multiple sensors is now given. One may combine array processing with the TDOA-CIGL computation. The idea is to do beam steering on the array data to form a one-dimensional stream of data, and then to determine the correlation surface based on that. To describe this idea, suppose the array data from platform i at snapshot m is put through a complex linear combiner with beam weights represented by the vector $\underline{W}_{im}$. Representing the time series data from the array by $\underline{x}_i(n,m)$, the beam output is $$b_i(n,m)=\underline{w}_{im}^H \underline{x}_i(n,m) \tag{EQ 3}$$

Note that n is the time index.

Now suppose it is these beams that are used in the correlation surface estimation in a manner similar to FIG. 7. We have, in effect, used array processing to condition the signals from each platform. The ultimate effect is to gain the same advantages afforded by array processing.

The method used to find $\underline{w}$ is flexible. For example, $\underline{w}$ can be the steering vector pointing to the test point (x,y,z), at time t. One should note, however, that this choice for weights may suffer from a form of self-nulling caused by a mismatch between the modeled array response and the true array response. The mismatch may be alleviated by projecting the calibration vectors into the measured signals subspace.

Another alternative way to generate the weight vectors is to use the Copy Capture Algorithm (CCA). The Copy Capture Algorithm may be understood with reference to FIG. 12, which shows a functional block diagram of an adaptive array 67 showing the primary system elements that it must possess to successfully achieve two objectives of enhancing desired signal reception and rejecting undesired interference signals. This improves geolocation accuracy in extreme environments wherein there are unknown and undesired interfering signals, and thermal background noise. The copy capture system utilizes two or more antennas on each aircraft. The copy capture system does not require received signals to possess any distinguishing features or known characteristics in order to separate co-channel, interfering signals of all types. Therefore it can be considered a universal or general purpose technique. Copy capture on constant modulus, transient, and amplitude modulated signals is within a fraction of a dB of the theoretical maximum signal-to-interference-plus-noise-ratio (SINR). Such a copy capture arrangement is taught in PCT application US2003/023158 filed Jul. 23, 2003 and then subsequently filed in the United States as U.S. patent application Ser. No. 10/529,829 on Mar. 30, 2005. The copy capture system captures and copies co-channel interfering signals by a union of fast Fourier transform (FFT) frequency domain processing and non-linear time domain processing.

Copy signal orthogonalization (signal independence is assumed) of equally weighted eigenstreams is used in conjunction with a capture/thresholding process to spatially separate the interfering signals. Time and frequency domain processing uses normalized spectral bin $f(\omega_i)/|f(\omega_i)|$ and $f(t_i)/|f(t_i)|$ multiplications to capture the strongest signal at each step, for each output, as a beam former converges. Time domain and fast Fourier transform bin thresholding is the key to the capture process, and only strong spectral and time domain complex samples are used as product elements for each new iteration of eigenstream processing.

In utilizing the copy capture algorithm (CCA) with the present invention the CCA processing of signal samples received using the individual antennas and receivers on a particular moving aircraft is done on each moving aircraft. After the processing is completed a single set of cleaned up signal samples are forwarded to remote processor 20 for TDOA/CIGTL processing as has already been previously described in detail. That is, at a moment in time $t_1$ a signal sample is taken by each of the plurality of antennas on a single moving platform or aircraft such as aircraft 14 and 15. After the CCA processing the result is a single cleaned up signal sample at time $t_1$ to which the time stamp for time $t_1$ is attached along with a location stamp identifying where the aircraft was when the signal sample was taken. It is this single cleaned up signal sample that is forwarded to remote processor 20. A time stamp is placed on the individual signal samples received by each of the individual antennas and receivers on a moving aircraft so that in CCA signal processing on the aircraft the appropriate signal samples are utilized from the different antennas. The location stamp is added after CCA processing.

In FIG. 12 adaptive array 67 system consists of an antenna array 50 comprising a plurality of antenna elements 50-1 through 50-n, a beam forming network 52 comprising a plurality of weighting circuits 53-1 through 53-n equal to the number of antenna elements 50-1 through 50-n, a summing circuit 54, and an adaptive pattern control processor 56 that calculates and adjusts the variable beam forming weights for the beam forming network 52. Processor 56 is shown subdivided into a signal processor unit 58 and an adaptive control algorithm 59. The manner in which these elements are actually implemented depends on the propagation medium in which the antenna array 50 is to operate and the frequency spectrum of interest.

The antenna array 50 consists of antenna elements 50-1 through 50-n and is designed to receive and transmit signals in a propagation medium of interest. The antenna elements 50-1 through 50-n are arranged to give adequate coverage (pattern gain) over a certain desired spatial region. The selection of antenna elements 50-1 through 50-n and their physical arrangement place fundamental limitations on the ultimate capability of the adaptive array system 67.

When using the present invention the antenna array 50 must contain one more antenna elements than the number of incident signals making up a received co-channel signal. Thus, a sufficient number of antenna elements should be provided to meet the contemplated maximum number of received interfering signals.

In FIG. 12, an incident electromagnetic signal $E(m,t)$ 51 impinges on antenna array 50 and arrives at each antenna element 50-1 through 50-n at different times as determined by the angle of arrival $\phi^m$ of signal 51 with respect to array 50 and the spacing of the antenna elements. The actual signal 51 may often comprise a number of co-channel interfering signals that must be separated using the copy capture technique. The voltage term $V(n,t)$ denotes the complex waveform envelope that is output from an antenna element and is the only quantity that conveys information. Rather than adopt complex envelope notation, it is assumed that all signals are represented by their complex envelopes so the common carrier reference never explicitly appears. Therefore each of the n channel received signals $V(n,t)$ represents the complex envelope of the output of one element of antenna array 50 and represents one or more signals, one of which may be a signal of interest and a noise component $\eta(n,t)$, and is represented by the equation:

$$V(n,t)=E(m,t)A_r(n,\phi^m)+\ldots E(m,t)A_r(n,\phi^m)+\eta(n,t) \quad (EQ\ 4)$$

Where $A_r(n, \phi^m)$ is defined above and in more detail here as the complex response of antenna (n) in azimuth direction $\phi^m$.

The voltages $V(1,t)$ through $V(n,t)$ output respectively from antenna elements 50-1 through 50-n are input to beam forming weighting circuits 53-1 through 53-n, and are also carried over leads 57 to signal processor 58 in adaptive pattern control processor 56. Processor 58 operates under control of the copy capture algorithm 59 to process signal 51 incident on antenna array 50 and calculate complex beam forming weights $W_e$ for each signal and for each of the n antenna elements making up antenna array 50.

The signal $V(1,t)$ through $V(n,t)$ output from each of the antenna elements 50-1 through 50-n is input to a respective one of weighting circuits 53-1 through 53-n in beam forming network 52 where it is multiplied by an associated one of the aforementioned complex beam forming weights $W_e(1,ns)$ through $W_e(N,ns)$ calculated for these same signals. The weighted signals output from each of the weighting circuits 53 are summed in summing circuit 54 to form a signal which is the separated copy stream for each of the signals making up signal 51 that is impinging on antenna array 50. Beam forming network 52 is implemented in software, there is one network 52 for each signal being copied and captured, and there are a set of weights for each signal.

The problem facing the adaptive pattern control processor 56 is to select the various complex weights $W_e$ for beam forming network 52 so that a certain performance criterion is optimized. The performance criterion that governs the operation of adaptive pattern control processor 58 must be chosen to reflect steady-state performance characteristics that are of concern. The most popular performance measures that have been typically employed in the prior art include the mean square error, signal to noise ratio, output noise power, maximum array gain, minimum signal distortion, and variations of these criteria that introduce various constraints into the performance index.

The incorporation of the copy capture algorithm (CCA) as the adaptive control algorithm 59 in processor 56 results in the ability to copy capture individual, interfering signals making up received signal 51 without resorting to modulation dependent beam forming techniques.

The calculation of the complex beam forming weights $W_e$ is done by performing all calculations in eigenspace to obtain eigenweights U that are used to beam form in this transformed space. Eigenspace beam forming simplifies and speeds up the weight processing calculations. Complex eigenspace beam forming weights U are then converted into complex antenna beam forming weights We which are applied via leads 57 to the weighting circuits 53 in the beam forming network 52 to capture a specific received signal associated with the weights. This captured signal is then inserted into the TDOA-CIGL algorithm shown in FIG. 7, as either $S_1(t)$ if the adaptive beamformer is located on aircraft(1) or $S_2(t)$ if the adaptive beamformer is located on aircraft (2). In areas of high signal interference, it is very advantageous to have adaptive beamformers on all TDOA-CIGL platforms.

While what has been described herein is the preferred embodiment of the invention it should be understood that those skilled in the art may make numerous changes without departing from the spirit and scope of the invention.

What is claimed is:

1. A method for locating a remote transmitter from which an electromagnetic signal is being received using an antenna and a receiver mounted on each of a plurality of moving platforms, and indicating the geolocation of the transmitter, the method comprising the steps of:
   (a) obtaining a plurality of sets of samples of the electromagnetic signal received with the antenna and receiver on each moving platform, there being one set of samples received at each moving platform for each of a plurality of time periods;
   (b) placing a time and location stamp on each of the signal samples obtained in step (a) indicating the time when and the location where each signal sample is taken;
   (c) transmitting the signal samples received at each moving platform and having the time and location stamps thereon per step (c) to a central location;
   (d) storing at the central location the set of signal samples transmitted in step (c) from each moving platform for each period of time;
   (e) processing the stored set of signal samples from all the moving platforms for each period of time to produce an individual data set for each period of time; and
   (f) analyzing the data sets produced in step (e) to determine the geolocation of the remote transmitter.

2. The method for locating a remote transmitter of claim 1 further comprising the step of:
   (g) summing the plurality of individual data sets produced in step (e) to produce a summation data set that has a distinctive point with a well defined peak value that is higher than the value of other peaks in the summation data set, the well defined peak value indicating the geolocation of the remote transmitter, wherein the summing reducing extraneous peaks in the individual data sets produced in step (e) and enhances the well defined peak in the summation data set; and
   wherein step (f) is performed on the summation data set produced in step (g) to locate the well defined peak which yields the geolocation of the remote transmitter.

3. The method for locating a remote transmitter of claim 2 wherein step (f) comprises a hill climbing algorithm such as a conjugate gradient search to locate the well defined peak in the summation data set which indicates the geolocation of the remote transmitter.

4. The method for locating a remote transmitter of claim 3 wherein the central location is separate from any of the plurality of moving platforms.

5. The method for locating a remote transmitter of claim 4 wherein the moving platforms are aircraft.

6. The method for locating a remote transmitter of claim 3 wherein the central location is separate from any of the plurality of moving platforms, and wherein the moving platforms are aircraft.

7. The method for locating a remote transmitter of claim 1 wherein the central location is separate from any of the plurality of moving platforms.

8. The method for locating a remote transmitter of claim 7 wherein the moving platforms are aircraft.

9. The method for locating a remote transmitter of claim 8 further comprising the step of:
   (g) summing the plurality of individual data sets produced in step (e) to produce a summation data set that has a distinctive point with a well defined peak value that is higher than the value of other peaks in the summation data set, the well defined peak value indicating the geolocation of the remote transmitter, wherein the summing reducing extraneous peaks in the individual data sets produced in step (e) and enhances the well defined peak in the summation data set; and
   wherein step (f) is performed on the summation data set produced in step (g) to locate the well defined peak which yields the geolocation of the remote transmitter.

10. The method for locating a remote transmitter of claim 1 wherein the moving platforms are aircraft.

11. The method for locating a remote transmitter of claim 5 wherein a highly accurate, source of time is used to provide the source of the time stamp placed on each signal samples obtained in step (a) at all of the aircraft, and wherein the global positioning system is used to provide the source of the location stamp placed on each signal samples obtained in step (a) at all of the aircraft.

12. The method for locating a remote transmitter of claim 1 wherein there is more than one antenna and receiver mounted on each moving platforms, and step (a) is repeated for the signals received by each antenna, and further comprising the steps of:
   (h) processing the set of signals samples received using each antenna and receiver on a moving platform for each of the plurality of time periods to minimize or remove the effects caused by such things as undesired interfering signals, and thermal background noise; and
   (i) generating a single set of cleaned up signal samples for each of the plurality of time periods using the processed sets of signal samples from step (h), the cleaned up signal samples being transmitted to the central location in step (c) after having the time and location stamps placed on each cleaned up signal sample in step (b).

13. A method for locating a remote transmitter from which an electromagnetic signal is being received using an antenna and a receiver mounted on each of a plurality of moving platforms, and indicating the geolocation of the transmitter on the terrain of the earth, the method comprising the steps of:
   (a) sampling the electromagnetic signal received at each of the moving platforms to produce a plurality of sets of signal samples that are digitized, there being one set of signal samples for each of a plurality of periods of time at each platform;
   (b) adding a time and location stamp on each of the digitized signal samples obtained in step (a) indicating the time when and geolocation where each digitized signal sample is taken on a moving platform;
   (c) transmitting each set of digitized signal samples with their time and location stamps from each moving platform to a common location for processing;
   (d) storing the sets of digitized signal samples transmitted in step (c) to the common location in a covariance matrix for each of the plurality of periods of time;

(e) processing the sets of digitized signal samples received from all platforms for each of the plurality of periods of time to produce a like plurality of individual data sets;

(f) summing and normalizing all of the individual data sets produced in step (e) to produce a summation data set; and (g) analyzing the summation set of data produced in step (f) to determine the geolocation of the remote transmitter.

14. The method for locating a remote transmitter of claim 13 wherein the summation data set produced in step (f) has a well defined peak that is higher than any other peaks in the summation data set, the well defined peak indicating the geolocation of the remote transmitter; and wherein step (g) is performed on the summation data set produced in step (f) to locate the well defined peak which indicates the geolocation of the remote transmitter.

15. The method for locating a remote transmitter of claim 13 wherein the moving platforms comprise aircraft.

16. The method for locating a remote transmitter of claim 15 wherein the common location for processing is separate from any of the plurality of moving platforms.

17. The method for locating a remote transmitter of claim 16 wherein a highly accurate, source of time is used to provide the source of the time stamp placed on each signal samples produced in step (a) at all of the aircraft, and wherein the global positioning system is used to provide the source of the location stamp placed on each signal samples produced in step (a) at all of the moving platforms.

18. The method for locating a remote transmitter of claim 17 wherein step (g) comprises utilizing a hill climbing algorithm such as a conjugate gradient search to locate the well defined peak in the summation data set which indicates the geolocation of the remote transmitter.

19. The method for locating a remote transmitter of claim 13 wherein there is more than one antenna and receiver mounted on each moving platforms, and step (a) is repeated for the signals received by each antenna, and further comprising the steps of:

(h) processing the set of signals samples received using each antenna and receiver on a moving platform for each of the plurality of time periods to minimize or remove the effects caused by such things as undesired interfering signals, and thermal background noise; and (i) generating a single set of cleaned up signal samples for each of the plurality of time periods using the processed sets of signal samples from step (h), the cleaned up signal samples being transmitted to the central location in step (c) after having the time and location stamps placed on each cleaned up signal sample in step (b).

20. The method for locating a remote transmitter of claim 13 wherein step (g) comprises utilizing a hill climbing algorithm such as a conjugate gradient search performed on the summation data set to geolocate the remote transmitter.

21. A method for locating a remote transmitter from which an electromagnetic signal is being received using an antenna and a receiver mounted on each of a plurality of moving platforms, and indicating the geolocation of the transmitter, the method comprising the steps of:

(a) obtaining a plurality of sets of samples of the electromagnetic signal received with the antenna and receiver on each moving platform, there being one set of samples received at each moving platform for each of a plurality of time periods;

(b) placing a time and location stamp on each of the signal samples obtained in step (a) indicating the time when and the location where each signal sample is taken;

(c) transmitting the signal samples received at each moving platform and having the time and location stamps thereon per step (b) to a central location that is separate from any of the plurality of moving platforms;

(d) storing at the central location the set of signal samples transmitted in step (c) from each moving platform for each period of time;

(e) processing the stored set of signal samples from all the moving platforms for each period of time to produce an individual data set for each period of time; and (f) summing the plurality of individual data sets produced in step (e) to produce a summation data set that has a distinctive point with a well defined peak value that is higher than the value of other peaks in the summation data set, the well defined peak value indicating the geolocation of the remote transmitter, wherein the summing reducing extraneous peaks in the individual data sets produced in step (e) and enhances the well defined peak in the summation data set; and (g) analyzing the summation data sets produced in step (f) using a hill climbing algorithm such as a conjugate gradient search to locate the well defined peak in the summation data set to determine the geolocation of the remote transmitter.

* * * * *